(12) United States Patent
Carotenuto

(10) Patent No.: US 8,089,827 B2
(45) Date of Patent: Jan. 3, 2012

(54) METHOD FOR LOCALIZING REMOTE DEVICES, USING ACOUSTICAL AND ELECTROMAGNETIC WAVES

(75) Inventor: Riccardo Carotenuto, Rome (IT)

(73) Assignees: Riccardo Carotenuto, Motta San Giovanni-Lazzaro (RC) (IT); Giuseppe Cardinale Ciccotti, S. Marinella (IT)

( * ) Notice: Subject to any disclaimer, the term of this patent is extended or adjusted under 35 U.S.C. 154(b) by 341 days.

(21) Appl. No.: 12/514,847

(22) PCT Filed: Nov. 28, 2007

(86) PCT No.: PCT/IT2007/000830
§ 371 (c)(1),
(2), (4) Date: May 14, 2009

(87) PCT Pub. No.: WO2008/065691
PCT Pub. Date: Jun. 5, 2008

(65) Prior Publication Data
US 2010/0061186 A1 Mar. 11, 2010

(30) Foreign Application Priority Data
Nov. 30, 2006 (IT) .............................. RM2006A0638

(51) Int. Cl.
*G01S 3/80* (2006.01)

(52) U.S. Cl. .......... 367/128; 367/98; 367/118; 367/124; 367/126

(58) Field of Classification Search .................. 367/118, 367/124, 126–128, 98
See application file for complete search history.

(56) References Cited

U.S. PATENT DOCUMENTS

| 3,731,273 | A | * | 5/1973 | Hunt | ................................ 367/13 |
| 4,067,015 | A | * | 1/1978 | Mogavero et al. | ........... 340/13.1 |
| 4,247,922 | A | | 1/1981 | Jackson et al. | |
| 4,264,978 | A | * | 4/1981 | Whidden | ................... 455/67.12 |
| 5,319,611 | A | * | 6/1994 | Korba | ............................. 367/98 |
| 5,412,619 | A | | 5/1995 | Bauer | |
| 5,491,670 | A | | 2/1996 | Weber | |
| 5,504,477 | A | * | 4/1996 | Whitright et al. | ............ 340/10.4 |

(Continued)

OTHER PUBLICATIONS

Boukerche, A.; Oliveira, H.A.B.; Nakamura, E.F.; Loureiro, A.A.F.; "Localization systems for wireless sensor networks," Wireless Communications, IEEE , vol. 14, No. 6, pp. 6-12, Dec. 2007.*

(Continued)

*Primary Examiner* — Thomas Tarcza
*Assistant Examiner* — James Hulka
(74) *Attorney, Agent, or Firm* — Young & Thompson

(57) ABSTRACT

Localization of remote devices by: the emission of pulses from acoustic transmitters, whose wavefronts propagate in the space region occupied by the remote devices and finally reach them; the emission of radiofrequency pulses from each remote device at the time of detection of the wavefront by an on-board microphone; the acquisition, by a radio base, of the radiofrequency signals propagating from the remote devices, to evaluate the arrival time delays proportional to the distance between the i-th acoustic source and the j-th remote device; the formation of a reception vector for each emission by the i-th source, this vector having a maximum length M equal to the number of remote devices and consisting of the sequence of distances obtained as the product of the reception times and the estimated sound velocity. These steps are repeated for all acoustic sources, to form N+1 reception vectors, to calculate the position of the device by solving derived matrix equations.

9 Claims, 1 Drawing Sheet

U.S. PATENT DOCUMENTS

Figure 1:
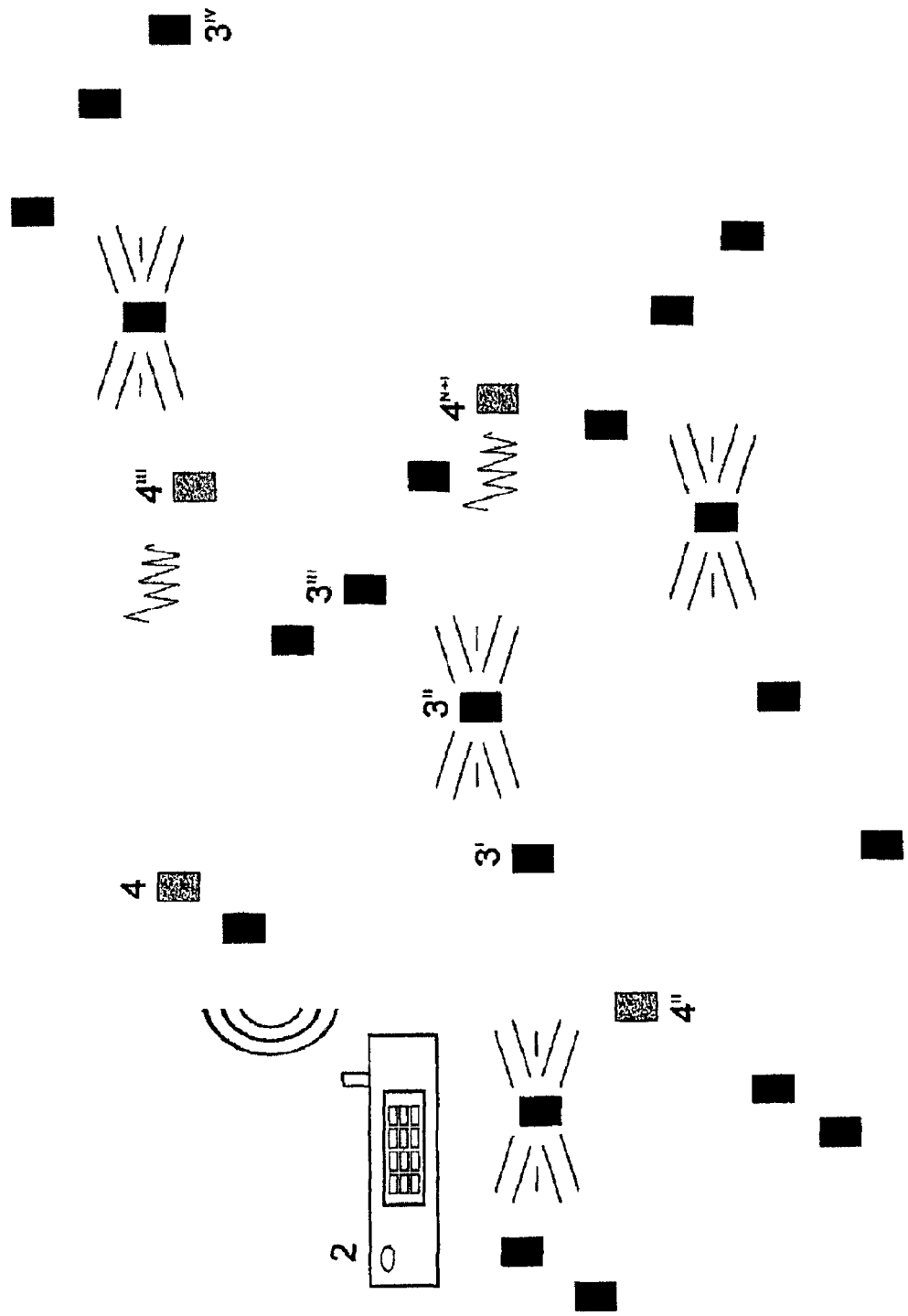

| | | | | |
|---|---|---|---|---|
| 5,528,232 A | * | 6/1996 | Verma et al. | 340/8.1 |
| 5,550,726 A | | 8/1996 | Hiromachi et al. | |
| 6,141,293 A | * | 10/2000 | Amorai-Moriya et al. | 367/127 |
| 6,176,837 B1 | * | 1/2001 | Foxlin | 600/595 |
| 6,317,386 B1 | * | 11/2001 | Ward | 367/127 |
| 6,348,856 B1 | * | 2/2002 | Jones et al. | 340/10.1 |
| 6,404,703 B1 | * | 6/2002 | Burrell | 367/128 |
| 6,470,002 B1 | * | 10/2002 | Jones et al. | 370/345 |
| 6,553,013 B1 | * | 4/2003 | Jones et al. | 370/328 |
| 6,590,834 B1 | * | 7/2003 | Highfill | 367/128 |
| 6,710,719 B1 | * | 3/2004 | Jones et al. | 340/8.1 |
| 2003/0142587 A1 | * | 7/2003 | Zeitzew | 367/127 |

OTHER PUBLICATIONS

Andreas Savvides, Mani Srivastava, Lewis Girod and Deborah Estrin; "Localization in Sensor Networks" Engineering Wireless Sensor Networks, Chapter 15, p. 327-349. Nov. 2004.*

Andreas Haeberlen, Eliot Flannery, Andrew M. Ladd, Algis Rudys, Dan S. Wallach, and Lydia E. Kavraki; "Practical robust localization over large-scale 802.11 wireless networks" In Proceedings of the 10th annual international conference on Mobile computing and networking. ACM, New York, NY, USA, 70-84. Aug. 2004.*

International Search Report dated Apr. 1, 2008, from corresponding PCT application.

* cited by examiner

METHOD FOR LOCALIZING REMOTE DEVICES, USING ACOUSTICAL AND ELECTROMAGNETIC WAVES

TECHNICAL FIELD

The invention relates in general to a technique—and to the related apparatus—for localizing identical, remote devices. More specifically, it relates to a localization method (position determination method) which uses quick search protocols optimised also under the aspect of noise immunity.

BACKGROUND ART

Methods for estimating a distance, normally used for measuring distances in one dimension only, are already known. Some systems were based on ultrasonic methods, which detect the echo of the pulse and utilise highly directional transducers pointing towards the target, in order to measure the position and distance. With such technique, the distance between a transducer and a receiver is indirectly determined by means of the elapsed time, normally called "flight time", during which the signal generated at the transmitter impinges on the receiver and is reflected back to the transmitter.

Distances are determined by measuring the elapsed time starting from the emission of the pulse that travels from the transmitter to each of the receivers. The computation of coordinates is usually done using simple triangulation and/or lateration.

More recently, sensors and distributed calculus systems in combination with high-density wireless networks for the collection and the distribution of environmental data, have become widespread, due to their important relation with problems like public welfare, society, environment protection, etc. The basic idea consists in distributing in a space region a great number of sensors with all-sufficient supply and having a low unitary cost, capable of forming the nodes (branch points) of a wireless network, of acquiring data, and of performing simple processing operations. These sensors may for instance include temperature sensors, humidity sensors, illumination sensors, acoustic microphones or ultrasonic sensors, magnetic sensors, inertial sensors, or optical sensors.

A typical goal of a sensor network is to detect, monitor and classify objects or events, or to measure the value of parameters in the neighborhood of this network.

For example, one can imagine to construct the network nodes as small as maize seeds, provided with micro-batteries and capable of measuring the temperature and humidity, of transmitting the acquired data to a radio base, and above all, of determining their own position (localization) with respect to a given reference frame. A farmer could "seed" the nodes of the network in a maize field, and these would then transmit an accurate map of the temperature and humidity of the soil detected on the whole field. Other very promising applications concern home automation (domotics) and will allow to monitor the position and parameters of objects and persons inside a house, to govern the management of storehouses, and more generally the logistics, in order to be able to determine the position and to control the flow of products, and lastly, to perform the automatic survey of excavations and manufactured articles.

In general, the network structure can be "summed up" as follows: a certain number of low-cost nodes provided with adequate sensor properties, with limited processing capabilities, and provided with a communication system with a low energy consumption, are distributed inside a given space region. The measured entities are pre-processed locally, and the result is transmitted to a local central station (Central Information Processor, CIP) through a low-power communication network. The CIP system processes the information transmitted from the sensors and sends the result to a processing centre of higher hierarchical level [1, 2, 3, 4, 5, 6]. Certain algorithms for processing the data provided by the sensors present in the network nodes assume that the position of each node is given [7]. However, often a sufficiently accurate knowledge of the node positions is not available. The single nodes are often positioned on the field by persons, or by throwing them from aeroplane platforms. A particular case concerns nodes provided with position sensors. These nodes may for instance be positioned on objects or persons whose position it is desired to continuously monitor in time, and the desired output from the system then consists in the knowledge of the position of each sensor with respect to a reference frame.

To this end, each node could be provided with a Global Positioning System (GPS), but this solution would be very expensive and would increase significantly the energy consumption of each node. Moreover, the spatial resolution provided by the GPS could be insufficient for many applications, like the accurate determination of the position (localization) of objects and persons inside a house. Self-localization in networks of sensors is nowadays a very active field of research [3, 7, 8, 9].

SUMMARY OF THE INVENTION

The object of the present invention is to provide an ingenious algorithm for the determination of the position of remote devices, which is based on the joint use of acoustic and electromagnetic waves, and is characterised by a high reliability and immunity with respect to ambient noise.

A further object of the present invention resides in the ability of determining the position of identical remote devices which are not provided with any kind identification code.

An additional object of the present invention is to provide a method for detecting remote devices by using acoustical and electromagnetic waves, which is based on the use of standard technologies and protocols that are already known in the field of remote detection and of electronic technologies, in order to facilitate maintenance and improve reliability while limiting costs at the same time.

These and other objects are attained by means of a system (apparatus) for detecting the position, and by a related technique for the determination of the coordinates of M devices arranged on points of interest in an N-dimensional coordinate system, according to the principles illustrated in the appended claims.

The apparatus includes a system of transmitters of an acoustical kind, for the emission of acoustic signals towards a plurality of receivers positioned according to the specific coordinates of the points of interest.

The method provides analysis means associated with the apparatus, which are capable of processing the measurements related to the distances between the transmitter and each receiver. The analysis means comprise in turn detection means and data processing means. The detection means first produce acoustic pulses whose emission times are detected, and then the respective measurements are performed, relating to the time period between the signal transmission and the reception by the receiver of the corresponding electromagnetic wave. The calculation means are used to process the measurements of the times and therefore of the acquired distances. More specifically, a set of "lighthouses", or "buoys", emits a sequence of acoustical pulses or ultrasound pulses inside the space region containing the remote devices, that is, the network elements. At the time each remote device is reached by the acoustical wavefront, it transmits, independently of all other devices, an acknowledge signal to the radio base (or CIP), in the form of a radiofrequency signal (RF) in the free ISM band. The radio base knows the positions of the "lighthouses" and the arrival times of the acknowledge signals, and based on these data it calculate the position of each remote device, using a robust algorithm. The algorithm, taking advantage of the geometrical constraints of the problem, is capable of eliminating false acknowledge signals due to undesired acoustical reflections, to environmental disturbances, or other causes.

The system is capable of operating in noisy environments with hundreds of remote devices located in spatial regions of hundreds of square meters.

DESCRIPTION OF A PREFERRED EMBODIMENT

For the only purpose of more clearly illustrating the invention, but without limiting in this way its applicability and scope, in the following description some specific embodiments will be described by referring to the annexed FIG. 1, the latter showing a schematic representation by functional blocks of the "way of operation" of the present invention.

The proposed system is based on a network structure in which the whole computational power is concentrated inside the radio base 2 unit, while the localization section for detecting the individual remote devices $3', 3'', \ldots, 3^M$ is extremely simple; in addition, the capability of localizing identical remote devices allows a mass production of remote devices and an enormous reduction of production costs.

The proposed system can take advantage of the integration on a single chip of: a computing unit with sensors, circuits for conditioning and converting a signal, and a wireless communication electronics, thereby allowing to construct complete systems, the so-called systems-on-chip (SOC), which render the present system even more attractive.

A system will be described together with a related method for determining in an N-dimensional reference system the position of a multiplicity of remote devices, which possibly are provided with on-board sensors, wherein, these remote devices 3 receive signals from appropriate acoustic or ultrasonic emitters 4 whose number is N+1 or more.

The system therefore includes a plurality of emitters $4', 4'', \ldots, 4^{N+1}$ of acoustic or ultrasonic waves which are called "lighthouses" or "buoys" and which emit a sequence of acoustical pulses or ultrasonic pulses in the region of space containing the remote devices, whose position is to be determined in relation to the given reference frame. The pressure waves propagate through the (gaseous, liquid or solid) medium and reach the remote devices $3', 3'', \ldots 3^M$.

In the instant of time when each device is reached by the acoustical wave front, it transmits—independently from all other devices—an omnidirectional, acknowledge radiofrequency signal (RF), which is detected by the radio base unit (or CIP). The radio base 2 is aware of the positions of the acoustical "lighthouses" $4', 4'', \ldots, 4^{N+1}$ and of the arrival time delays of the acknowledge signals, and based on these data it computes the position of each node, making use of a robust algorithm described below.

Each remote device 3 is formed at least by the following components:
  a microphone operating in the acoustical band of interest and detecting the behaviour of the acoustical pressure field at the sensor position and the arrival of the wave fronts emitted by the lighthouses;
  a signal conditioning circuit (impedance adaptation, amplifier, off-band noise rejection filter);
  a signal recognition system, that identifies the useful signal among all received sounds (in its simplest form this will be a threshold detecting circuit, or a circuit capable of effecting a comparison by means of a cross-correlation with a sample signal, a circuit for estimating statistical indicators, neural networks, etc.);
  a RF transmitter in an adequate band (for instance ISM), for communicating the already occurred reception to the base station; possibly, for the purpose of a correct association of the reading of the on-board sensors with the remote device position in the reference system, the transmitter should be able to transmit a code that univocally identifies the remote device and the data read by its sensors;
  a controller, whose task is to manage the reception of the acoustic signal, the processing of the signal, and the transmission of the occurred reception.

The radio base 2 is formed at least by the following components:
  N+1 transmitters of acoustic or ultrasonic pulses, whose band is selected according to the accuracy requirements of the position determination (localization), to the maximum distance of the remote devices $3', 3'', \ldots 3^M$ from the emitters, and to the noise-free character of the operations; the transmitter positions within the given reference frame is known with sufficient accuracy;
  a RF receiver, suited to detect signals related to the positioning and reading of on-board sensors, that are emitted by the individual remote devices;
  a calculation system used for calculating the position of the remote devices $3', 3'', \ldots, 3^M$ starting from the difference between the emission times of the acoustical pulse and the reception of the radiofrequency signal;
  an algorithm, performed by the calculation system of the radio base 2, which is based on a matrix formulation of the localization problem and is suited to provide the position of the remote devices $3', 3'', \ldots 3^M$ in the given reference frame.

Operational Modalities of the Position Detecting (Localization) System

The first acoustic transmitter emits a possibly coded pulse; the acoustical wave front propagates in the space region occupied by the remote devices $3', 3'', \ldots 3^M$ reaching these latter. The remote devices emit the RF pulse at the time of detection of the wave front by their on-board microphone. Then, the base station 2 detects and records the RF signals arriving from the remote devices $3', 3'', \ldots 3^M$, which for the time being are assumed to be identical and not coded and permit to estimate the arrival times. The arrival times are proportional to the distance $d_{ij}$ between the i-th acoustical source and j-th remote device.

In the absence of noise (e.g. acoustic reflections due to the environment), the number of received signals corresponds to the number of remote devices reached by the acoustical wave front with sufficient energy.

The measurement of the flight time between the emission from the i-th source and the receipt by the j-th remote device, allows to determine the distance between the source and the remote device, by assuming first that the propagation velocity is known, constant in time, and the same in all the space region of interest. For each emission by the i-th source, a reception vector $D_i$ is formed, consisting of the set of distances obtained from the products of the reception times by the estimated sound velocity. The listening time window is selected by taking account of the maximum useful distance of the remote devices. Generally, in a noise-free situation, the vector $D_i$ has a maximum length M corresponding to the number of remote devices $3'$, $3''$, ... $3^M$. When acoustic or electromagnetic noise is present, which could be erroneously interpreted as additional reception signals, the reception vector has a length $L_i > M$. By repeating the above discussion for all acoustic sources, or buoys, one obtains N+1 reception vectors.

The position $X_j=(x_{1j}, x_{2j} \ldots x_{Nj})$ of the j-th device may be calculated from the N+1 distances $d_{1j}, d_{2j}, \ldots d_{N+1j}$, as the intersection point of the N+1 spheres of radius $d_{ij}$ centred at the positions $(x_{Si}, y_{Si}, z_{Si}$, where i=1, 2, ... N+1) of the N+1 acoustic sources. If N=3, putting $x_{1j}=x_j, x_{2j}=y_j, x_{3j}=z_j$, one obtains:

$$\begin{cases} (x_j - x_{S1})^2 + (y_j - y_{S1})^2 + (z_j - z_{S1})^2 - d_{1j}^2 = 0 \\ (x_j - x_{S2})^2 + (y_j - y_{S2})^2 + (z_j - z_{S2})^2 - d_{2j}^2 = 0 \\ (x_j - x_{S3})^2 + (y_j - y_{S3})^2 + (z_j - z_{S3})^2 - d_{3j}^2 = 0 \\ (x_j - x_{S4})^2 + (y_j - y_{S4})^2 + (z_j - z_{S4})^2 - d_{4j}^2 = 0. \end{cases} \quad (1)$$

Subtracting the first equation from the other ones, the result is a linear system with 3 equations and 3 unknowns $(x_j, y_j, z_j)$, the latter being the coordinates of the remote device in the 3-dimensional reference system defined for the acoustical sources:

$$\begin{bmatrix} x_{S2}-x_{S1} & y_{S2}-y_{S1} & z_{S2}-z_{S1} \\ x_{S3}-x_{S1} & y_{S3}-y_{S1} & z_{S3}-z_{S1} \\ x_{S4}-x_{S1} & y_{S4}-y_{S1} & z_{S4}-z_{S1} \end{bmatrix} \begin{bmatrix} x_j \\ y_j \\ z_j \end{bmatrix} = \quad (2)$$

$$\begin{bmatrix} x_{S2}^2 - x_{S1}^2 + y_{S2}^2 - y_{S1}^2 + z_{S2}^2 - z_{S1}^2 + d_{1j}^2 - d_{2j}^2 \\ x_{S3}^2 - x_{S1}^2 + y_{S3}^2 - y_{S1}^2 + z_{S3}^2 - z_{S1}^2 + d_{1j}^2 - d_{3j}^2 \\ x_{S4}^2 - x_{S1}^2 + y_{S4}^2 - y_{S1}^2 + z_{S4}^2 - z_{S1}^2 + d_{1j}^2 - d_{4j}^2 \end{bmatrix}.$$

The above equation may be rewritten in compactly matrix form:

$$AX_j = B_j, \quad (3)$$

and solved as follows:

$$X_j = A^{-1} B_j \quad (4).$$

It is possible to show that by appropriately positioning the sources, the matrix A is invertible [10].

The position $x_j$ of the j-th remote device may be calculated from A, which in turn is given by the known positions of the sources and from the (N+1)-ple $(d_{1j}, d_{2j}, \ldots d_{N+1j})$. Unfortunately, due to the system structure and to the sequence of the above described operations, it is impossible to distinguish a priori, for each remote device j, the N+1-ple $(d_{1j}, d_{2j}, \ldots d_{N+1j})$ within the reception vectors $(D_1, D_2, D_{N+1})$.

Therefore, an adequate search algorithm is necessary, that allows to select the possible candidates $(d_{1j}, d_{2j}, \ldots d_{N+1j})$, within the reception vectors $(D_1, D_2, \ldots D_{N+1})$. Thereafter, the vector $X_j$ is calculated by means of equation (4).

The vector $X_j$ is then evaluated in equation (1), and it can be considered an admissible solution of the localization problem provided the obtained residue is zero or less than a predetermined threshold, the latter taking account of the total noise affecting the calculation as a whole.

The above steps are repeated until the positions of all the other M remote devices $3'$, $3''$, ... $3^M$ have been calculated.

The search algorithm plays a fundamental role in the above described operations. In fact, in the absence of an appropriate strategy, in the worst case and in the absence of noise, a number of $M^{N+1}$ evaluations must sequentially be performed on the equation (4) and equation (1), and this number could be very high. For example, for N=3 (3D case) and M=100, the number of evaluations is 10.

In case of noise/disturbances, the number of evaluations increases up to $L_1 \cdot L_2 \cdot \ldots L_{N+1}$, with $L_i > M$.

An appropriate search algorithm will now be described, allowing to considerably reduce the computational work, which is based on the consideration that the sources are located within a sphere of radius $r_{max}$ and the elements of each N+1 ple $(d_{1j}, d_{2j}, \ldots d_{N+1j})$ therefore do not differ from each other by more than $2r_{max}$.

The algorithm operates as follows:

from one of the vectors $D_i$, e.g. from the vector $D_1$, one extracts the first element, $d_{11}$;

from the remaining vectors $D_i$ (i=2, 3, ... N+1) one extracts all elements which differ at most by $2r_{max}$, and which consequently are possible candidates. For reasonable choices of $r_{max}$ the number of such elements slightly exceeds N+1;

all combinations of extracted elements are calculated, without exchange between elements of different vectors, and said combinations are used to compute a set of $X_j$ from eq. (4);

if one combination produces, by eq. (4), a zero o sufficiently small residue in eq. (1), then the first extracted element $d_{11}$ is a valid reception signal. In this case the just obtained coordinate of the remote device is stored and the N+1 elements giving rise to the vector $x_j$, which is a solution of equation (1), are eliminated from the respective vectors $D_i$;

otherwise, none of the combinations gives a valid result, and so it may be concluded that the first element extracted from the vector $D_1$ is not valid, that is, it corresponds to a disturbance (noise). This element is removed from the vector $D_1$;

afterwards, in both of the previous cases, the first element of $D_1$ is selected again and the previous steps are repeated until the elements of the vector $D_1$ are exhausted. As a result of this algorithm, the coordinates of all M remote devices are surely identified. In the vectors $D_i$ (i≠1) there remain $L_i$–M residual elements corresponding to the received disturbances.

The proposed system can operate also in a different modality, the so-called "single shot" modality. In this modality, the acoustic sources simultaneously emit their pulses, which can be indistinguishable one form the other for what concerns the behaviour of the signal. This implies a simplification of the hardware, that provides the same pulse transducer unit for all acoustic sources, and an advantage in terms of frequency of repetition of the pulses, and therefore of the refresh times of the positions, since only one acoustic wave front propagation time must be awaited in the space region of interest, instead of N+1 propagation times.

The difference with respect to the preceding modality consists in that it is no more possible to distinguish N+1 reception vectors, but there is only one vector D. There results that the relative position, or i-index of each element $d_{ij}$, remains undetermined, within the available data, while in the foregoing case the index i of each element $d_{ij}$ is fixed and known. Consequently, during the search of the elements belonging to the j-th N+1–ple, one must consider also the exchange of position in the N+1–ple of the elements extracted from the vector D, and this fact considerably increases the computational load.

The above described algorithm lends itself also to the system operation in the single-shot modality.

Actually, it suffices to apply the algorithm to N+1 identical vectors, each of which is a copy of the only one available vector D.

Computation of the Local-Velocity

A greater level of localization accuracy can be attained by evaluating from time to time the sound velocity on the (average) distance/path from the sources to a single remote device, since the variation of the sound velocity with temperature, humidity, air pressure, and especially in case of atmospheric disturbances, may not be neglected. At this point, eq. (2) is modified approximately as follows:

$$\begin{bmatrix} x_{S2}-x_{S1} & y_{S2}-y_{S1} & z_{S2}-z_{S1} & t_{2j}^2-t_{1j}^2 \\ x_{S3}-x_{S1} & y_{S3}-y_{S1} & z_{S3}-z_{S1} & t_{3j}^2-t_{1j}^2 \\ x_{S4}-x_{S1} & y_{S4}-y_{S1} & z_{S4}-z_{S1} & t_{4j}^2-t_{1j}^2 \\ x_{S5}-x_{S1} & y_{S5}-y_{S1} & z_{S5}-z_{S1} & t_{5j}^2-t_{1j}^2 \end{bmatrix} \begin{bmatrix} x_j \\ y_j \\ z_j \\ v_j \end{bmatrix} = \quad (5)$$

$$\begin{bmatrix} x_{S2}^2-x_{S1}^2+y_{S2}^2-y_{S1}^2+z_{S2}^2-z_{S1}^2 \\ x_{S3}^2-x_{S1}^2+y_{S3}^2-y_{S1}^2+z_{S3}^2-z_{S1}^2 \\ x_{S4}^2-x_{S1}^2+y_{S4}^2-y_{S1}^2+z_{S4}^2-z_{S1}^2 \\ x_{S5}^2-x_{S1}^2+y_{S5}^2-y_{S1}^2+z_{S5}^2-z_{S1}^2 \end{bmatrix},$$

where $t_{ij}$ is the arrival time of the wave front emitted from the i-th source towards the j-th remote device. Here, one considers the N+2–ple $(t_{1j}, t_{2j}, \ldots t_{N+2,j})$, within the reception vectors $(T_1, T_2, \ldots T_{N+2})$.

The solution is analogous to equations (3) and (4). The required sources are 5 or, in general, N+2. The matrix A must be inverted for each calculation of $X_j$ that involves $v_j$, the average sound velocity along the path form the source and the remote device. As in the previous case, it is possible to show that A is invertible, by appropriately arranging the sources.

The calculation proceeds as in the previous case, substituting $(D_1, D_2, D_{N+1})$ with $(T_1, T_2, \ldots T_{N+2})$, and is complicated by the fact that it is necessary to invert the matrix A for each evaluation of $X_j$, and by the fact that the number of sources is increased, e.g. from 4 to 5 in the 3D case.

BIBLIOGRAPHY (1) J. N. Ash and R. L. Moses, "Acoustic time delay estimation and sensor network self-localization: experimental results," J. Acoust. Soc. Am., vol. 118, No. 2, August 2005.
(2) R. L. Moses, D. Krishnamurthy, R. M. Patterson, "A self-localization method for wireless sensor networks", EURASIP Journal on Applied Signal Processing, vol. 4, pp. 348-358, 2003.
(3) D. Esrin, L. Girod, G. Pottie, and M. Srivastava, "Instrumenting the world with wireless sensor networks", Proc. IEEE Int. Conf. Acoustics, Speech, Signal Processing, vol. 4, pp. 2033-2036, Salt Lake City, Utah, USA, May 2001.
(4) G. Pottie, and W. Kaiser, "Wireless integrated networks sensors", Communications of the ACM, vol. 43, No. 5, pp. 51-58, 2000.
(5) S. Kumar, D. Shepherd, and F. Zhao eds., "Collaborative signal and information processing in microsensor networks", IEEE Signal Processing Magazine, vol. 19, No. 2, pp. 13-14, 2002.
(6) N. Bulusu, J. Heidemann, an D. Esrin, "GPS-less low cost outdoor localization for very small devices", IEEE Personal Communications Magazine, vol. 7, n. 5, pp. 28-34, 2000.
(7) C. Savarese, J. Rabaey, and J. Beutel, "Locationing in distributed ad-hoc wireless sensor networks", Proc. IEEE Int. Conf. Acoustics, Speech, Signal Processing, vol. 4, pp. 2037-2040, Salt Lake City, Utah, USA, May 2001.
(8) A. Savvides, C.-C. Han, and M. B. Strivastava, "Dynamic fine-grained localization in ad-hoc networks f sensor", Proc. 7th Annual Int. Conf. On Mobile Computing and Networking, pp. 166-179, Rome, Italy, July 2001.
(9) L. Girod, V. Bychkovskiy, J. Elson, and D. Esrin, "Locating tiny sensors in time and space: a case of study", proc. Int. Conf. On Computer Design, vol. 3, pp. 1870-1874, Freiburg, Germany, September 2002.
(10) F. Figueroa, and E. Barbieri, "Position detecting System and method, U.S. Pat. No. 5,280,457, 1994.

The invention claimed is:

1. A method for localization of M remote devices ($3'$, $3''$, $\ldots 3^M$) by their coordinates within an N-dimensional system, through a) the emission of acoustical pulses and b) the emission of radiofrequency pulse from each remote device ($3'$, $3''$, $\ldots 3^M$), at the time of detection of said acoustical wave front by its on-board microphone, and c) the acquisition from a radio base (2) unit, of the radiofrequency signals and time delays which are proportional to the distance ($d_{ij}$) between the i-th acoustical source (4) and the remote j-th device (3);

comprising:
  d—for each emission from the i-th source, successive insertion of components in a reception vector ($D_i$), formed by the sequence of distances obtained from the product of the arrival time delays with an estimated sound velocity, said vector,
  i—in the absence of disturbances, having a maximum length M corresponding to the number of remote devices;
  ii—in presence of disturbances of an acoustical or electromagnetic kind, that could erroneously be interpreted as additional reception signals, being "oversized" according to the noise/disturbances, the number of evaluations being increased up to $L_1 \cdot L_2 \cdot \ldots L_{N+1}$, with $L_i > M$;
  e—repetition of the steps a, b, c, d for all N+1 acoustical sources, in order to form N+1 reception vectors;
  f—the calculation of the position $X_j = (x_{1j}, x_{2j}, \ldots x_{Nj})$ of the j-th remote device, starting from the N+1 distances $d_{1j}, d_{2j}, \ldots d_{N+1,j}$, as the intersection point of N+1 spheres of radius $d_{ij}$ centred at the positions $(x_{Si}, y_{Si}, z_{Si}$, where I=1, 2, \ldots N+1), of the N+1 acoustical sources.

2. The method for localization of remote devices ($3'$, $3''$, $\ldots 3^M$) by their coordinates within a 3-dimensional system according to claim 1, wherein after putting $x_{1j} = x_j$, $x_{2j} = y_j$, $x_{3j} = z_j$, one follows the following steps of matrix calculus:

a—subtraction of the first equation from the other equations, in the system $$\begin{cases} (x_j-x_{S1})^2+(y_j-y_{S1})^2+(z_j-z_{S1})^2-d_{1j}^2=0 \\ (x_j-x_{S2})^2+(y_j-y_{S2})^2+(z_j-z_{S2})^2-d_{2j}^2=0 \\ (x_j-x_{S3})^2+(y_j-y_{S3})^2+(z_j-z_{S3})^2-d_{3j}^2=0 \\ (x_j-x_{S4})^2+(y_j-y_{S4})^2+(z_j-z_{S4})^2-d_{4j}^2=0 \end{cases} \quad (1)$$

in order to obtain a linear system of three equations with three unknowns ($x_j$, $y_j$, $z_j$) from which one obtains the matrix equation for the coordinates of the remote device in the 3-dimensional reference system defined for the acoustical sources;

b—solving the above equation in vector form, $$X_j = A^{-1} B_j \quad (4)$$

the matrix A being invertible due to the arrangement of the sources, and calculating the position $X_j$ of the j-th remote device (3) based on the knowledge of A determined from the known positions of the sources, and from the N+1-ple $(d_{1j}, d_{2j}, \ldots d_{N+1j})$.

3. The method for localization of remote devices ($3'$, $3''$, ... $3^M$) by their coordinates within an N-dimensional system, according to claim 1, wherein an a priori distinction for each remote device j, of the N+1-ple $(d_{1j}, d_{2j}, \ldots d_{N+1j})$ within the reception vectors $(D_1, D_2, \ldots D_{N+1})$, occurs according to a search procedure that selects the possible candidates $(d_{1j}, d_{2j}, \ldots d_{N+1j})$ within the reception vectors $(D_1, D_2, \ldots D_{N+1})$, in order to calculate the vector $X_j$ by the equation $X_j = A^{-1} B_j$ (4), said vector $X_j$ being considered in equation (1) an admissible solution of the localization problem, provided that the obtained residue is zero, or less than a predetermined threshold taking account of the total noise affecting the calculation as a whole.

4. The method for localization of remote devices ($3'$, $3''$, ... $3^M$) by their coordinates within an N-dimensional system, according to claim 1, wherein, in case the sources lie within a sphere of radius $r_{max}$ so that the elements of each N+1-ple $(d_{1j}, d_{2j}, \ldots d_{N+1j})$ do not differ from each other by more than $2r_{max}$, the reduction of the computational work is obtained by a process comprising the following steps:

i—extracting the first element from one of the vectors $D_i$;

ii—extracting from the remaining vectors $D_i$, all elements that differ at most by $2r_{max}$, and which therefore are possible candidates, the number of these elements slightly exceeding N+1 for reasonable choices of $r_{max}$;

iii—calculating all combinations of the extracted elements, without exchanging the elements of different vectors, these combinations being used for calculating a set of $X_j$ from equation (4);

iv.a—if, via equation (4) one of said combinations gives a null or sufficiently small residue in equation (1), acquiring the first extracted element as a valid reception signal, and memorising the just obtained coordinate of the remote device while eliminating, from the respective vectors $D_i$, the N+1 elements which produce the vector $X_j$ solution of equation (1);

iv.b—if, none of the above combinations provides a valid result, invalidating the first element extracted from the vector, which represents a disturbance to be eliminated from that vector;

v—after both of the above cases iv.a and iv.b, selecting again the first element of $D_i$ and iterating the steps i, ii, iii, iv, until the elements of the vector are exhausted.

5. The method for localization of remote devices ($3'$, $3''$, ... $3^M$) by their coordinates within an N-dimensional system, according to claim 1, wherein all acoustic sources, tuned according to a single pulse emitting source, simultaneously emit their pulses which are possibly indistinguishable from each other in their signal behaviour, thereby using a single frequency of pulse repetition and establishing a wait regime bound to a single propagation time for the acoustical wavefronts in the space region of interest.

6. The method for localization of remote devices by their coordinates within an N-dimensional system, according to claim 4, wherein when using only one reception vector (D) for the search of the elements belonging to the j-th N+1-ple, one also takes account of the exchange of position within the N+1-ple, of the elements extracted from the vector D, in order to employ a procedure involving N+1 vectors $D_i$ identical to each other, each one being a copy of the unique available vector D, the procedure comprising the following steps:

i—extracting the first element from one of the vectors $D_i$;

ii—extracting from the remaining vectors $D_i$ all elements differing from each other at most by $2r_{max}$ and which therefore are possible candidates, the number of such elements slightly exceeding N+1 for reasonable choices of $r_{max}$;

iii—calculation of all combinations of extracted elements without exchanging elements belonging to different vectors, these combinations being used for calculating a set of $X_j$ from equation (4);

iv.a—if, in equation (1) one of these combinations, based on equation (4), produces a null or sufficiently small residue, the step of acquiring the first extracted element as valid reception signal, and thereafter the step of storing the just obtained coordinate of the remote device while eliminating from the respective vectors $D_i$ the N+1 elements which produce the vector $X_j$ solution of equation (1);

iv.b—otherwise, if none of the above combinations provides a valid result, the step of invalidating the first element extracted from the vector, which represents a disturbance to be eliminated from that vector;

v—after both of the above cases iv.a and iv.b, selecting again the first element of $D_i$ and iterating the steps i, ii, iii, iv, until the elements of the vector are exhausted.

7. The method for localization of remote devices by their coordinates within an N-dimensional system, according to claim 1, wherein optimising the accuracy of the localization through the evaluation from time to time of the sound velocity along the (average) path from the sources to the single remote device, this being achieved by modifying equation (2) as follows:

$$\begin{bmatrix} x_{S2} - x_{S1} & y_{S2} - y_{S1} & z_{S2} - z_{S1} & t_{2j}^2 - t_{1j}^2 \\ x_{S3} - x_{S1} & y_{S3} - y_{S1} & z_{S3} - z_{S1} & t_{3j}^2 - t_{1j}^2 \\ x_{S4} - x_{S1} & y_{S4} - y_{S1} & z_{S4} - z_{S1} & t_{4j}^2 - t_{1j}^2 \\ x_{S5} - x_{S1} & y_{S5} - y_{S1} & z_{S5} - z_{S1} & t_{5j}^2 - t_{1j}^2 \end{bmatrix} \begin{bmatrix} x_j \\ y_j \\ z_j \\ v_j \end{bmatrix} = \quad (5)$$

$$\begin{bmatrix} x_{S2}^2 - x_{S1}^2 + y_{S2}^2 - y_{S1}^2 + z_{S2}^2 - z_{S1}^2 \\ x_{S3}^2 - x_{S1}^2 + y_{S3}^2 - y_{S1}^2 + z_{S3}^2 - z_{S1}^2 \\ x_{S4}^2 - x_{S1}^2 + y_{S4}^2 - y_{S1}^2 + z_{S4}^2 - z_{S1}^2 \\ x_{S5}^2 - x_{S1}^2 + y_{S5}^2 - y_{S1}^2 + z_{S5}^2 - z_{S1}^2 \end{bmatrix},$$

where $t_{ij}$ is the arrival time delay at the j-th remote device of the wavefront emitted from the i-th source, according to the N+2-ple $(t_{1j}, t_{2j}, \ldots t_{N+2j})$ within the reception vectors $(T_1, \ldots, T_{N+2})$, wherein the required sources are N+2 and the matrix A is inverted for each computation of $X_j$ which involves $v_j$, corresponding to the average velocity of sound along the path between the source and the remote device.

8. An apparatus for the localization of remote devices ($3'$, $3''$, ... $3^M$) by their coordinates within an N-dimensional system, comprising:

I—a microphone that operates in an acoustical band of interest, used to detect a behaviour of the acoustical pressure field in a neighborhood of the microphone sensor and the arrival of emitted wavefronts;

II—a signal processing circuit including an impedance adaptation circuit, an amplifier, an off-band noise rejection filter;

III—a signal recognition circuit, used to identify the effective signal among all received sounds and including a threshold detecting circuit, or a circuit effecting a comparison through the cross-correlation with a sample signal, a circuit for estimating statistical indicators, neural networks, etc;

IV—a RF transmitter with an adequate band, used to communicate the already occurred reception to a radio base unit;

V—a controller, which manages the reception of the acoustic signal, the signal processing, and the transmission of the already occurred reception, wherein a) an emission of acoustical pulses and b) the emission of radiofrequency pulse from each remote device ($3'$, $3''$, ... $3^M$), at the time of detection of said acoustical wave front by the on-board microphone, and c) the acquisition from the radio base (2) unit, of the radiofrequency signals and time delays which are proportional to the distance ($d_{ij}$) between the i-th acoustical source (4) and the remote j-th device (3);

comprising:

d—for each emission from the i-th source, successive insertion of components in a reception vector ($D_i$), formed by the sequence of distances obtained from the product of the arrival time delays with an estimated sound velocity, said vector, i—in the absence of disturbances, having a maximum length M corresponding to the number of remote devices;

ii—in presence of disturbances of an acoustical or electromagnetic kind, that could erroneously be interpreted as additional reception signals, being "oversized" according to the noise/disturbances, the number of evaluations being increased up to $L_1 \cdot L_2 \cdot \ldots L_{N+1}$, with $L_i > M$;

e—repetition of the steps a, b, c, d for all N+1 acoustical sources, in order to form N+1 reception vectors;

f—the calculation of the position $X_j = (x_{1j}, x_{2j}, \ldots x_{Nj})$ of the j-th remote device, starting from the N+1 distances $d_{1j}, d_{2j}, \ldots d_{N+1j}$, as the intersection point of N+1 spheres of radius $d_{ij}$ centred at the positions ($x_{Si}, y_{Si}, z_{Si}$, where I=1, 2, ... N+1), of the N+1 acoustical sources.

9. An for the localization of remote devices ($3'$, $3''$, ... $3^M$) by their coordinates within an N-dimensional system, comprising a radio base (2) that includes at least the following components:

a—N+1 transmitters of acoustical pulses or ultrasound pulses, whose band is selected according to the localization accuracy requirements, to the maximum distance of the remote devices from the emitters, and to the noiselessness of the operations, wherein the position of the transmitters within the reference system is known in advance with a sufficient degree of accuracy;

b—a radiofrequency receiver (2), suited to detect signals related to the positions of on board sensors and to the readings of on-board sensors emitted by the individual remote devices;

c—a calculation system for computing the positions of the remote devices, starting from the difference between the acoustic pulse emission times and the reception time delays of the radiofrequency signal;

d—an algorithm, carried out by the calculation system of the radio base, which is based on a matrix formulation of the position determination problem and is suited to determine the position of the remote devices within the given reference frame, wherein a) an emission of acoustical pulses and b) the emission of a radiofrequency pulse from each remote device ($3'$, $3''$, ... $3^M$), at the time of detection of said acoustical wave front by the on-board microphone, and c) the acquisition from the radio base (2) unit, of the radiofrequency signals and time delays which are proportional to the distance ($d_{ij}$) between the i-th acoustical source (4) and the remote j-th device (3);

comprising:

d—for each emission from the i-th source, successive insertion of components in a reception vector ($D_i$), formed by the sequence of distances obtained from the product of the arrival time delays with an estimated sound velocity, said vector, i—in the absence of disturbances, having a maximum length M corresponding to the number of remote devices;

ii—in presence of disturbances of an acoustical or electromagnetic kind, that could erroneously be interpreted as additional reception signals, being "oversized" according to the noise/disturbances, the number of evaluations being increased up to $L_1 \cdot L_2 \cdot \ldots L_{N+1}$, with $L_i > M$;

e—repetition of the steps a, b, c, d for all N+1 acoustical sources, in order to form N+1 reception vectors;

f—the calculation of the position $X_j = (x_{1j}, x_{2j}, \ldots x_{Nj})$ of the j-th remote device, starting from the N+1 distances $d_{1j}, d_{2j}, \ldots d_{N+1j}$, as the intersection point of N+1 spheres of radius $d_{ij}$ centred at the positions ($x_{Si}, y_{Si}, z_{Si}$, where I=1, 2, ... N+1), of the N+1 acoustical sources.

\* \* \* \* \*